United States Patent [19]

Gardner et al.

[11] Patent Number: 4,876,647

[45] Date of Patent: Oct. 24, 1989

[54] APPARATUS FOR DETERMINING WATER STRESS IN CROPS

[75] Inventors: Bronson Gardner, Garfield Heights; Melvin E. Keener, Chagrin Falls; Steven C. DeSutter; Carl T. Jagatich, both of Aurora; Ralph A. Felice, Macedonia, all of Ohio

[73] Assignee: The Standard Oil Company, Cleveland, Ohio

[21] Appl. No.: 12,016

[22] Filed: Feb. 9, 1987

Related U.S. Application Data

[63] Continuation of Ser. No. 9,991, Feb. 2, 1987, abandoned, which is a continuation-in-part of Ser. No. 735,798, May 17, 1985, Pat. No. 4,755,942.

[51] Int. Cl.$^4$ ..................... G06F 15/20; A01G 25/16
[52] U.S. Cl. ................................................. 364/420
[58] Field of Search ..................... 356/222, 213, 229; 354/410; 137/78.2; 374/121; 364/420

[56] References Cited

U.S. PATENT DOCUMENTS

| | | | |
|---|---|---|---|
| 4,110,049 | 8/1978 | Younskevicus | 356/222 X |
| 4,182,566 | 1/1980 | O'Reagan | 354/268 |
| 4,209,244 | 6/1980 | Sahara et al. | 354/459 |
| 4,301,682 | 11/1981 | Everest | 374/112 |
| 4,303,973 | 1/1981 | Williamson, Jr. et al. | 364/189 |
| 4,322,805 | 3/1982 | Rog et al. | 364/481 |
| 4,354,484 | 10/1982 | Malone et al. | 126/425 |
| 4,420,265 | 12/1983 | Everest et al. | 374/133 |
| 4,516,206 | 5/1985 | McEvilly | 364/421 |
| 4,566,808 | 1/1986 | Pompei et al. | 374/124 |
| 4,609,288 | 9/1986 | Dodge | 356/222 X |
| 4,634,294 | 1/1987 | Christol et al. | 374/124 X |

OTHER PUBLICATIONS

Scherer, T. F. et al., "Automated Data Collection For Irrigation Scheduling Using Canopy-Air Temperature Difference," American Society of Agricultural Engineers Paper No. 83-2587, Dec. 1983.

Gardner, B. R., "Plant and Canopy Temperatures in Corn as influenced by Differential Moisture Stress" 43-44 (1980), University of Nebraska.

Gardner, B. R., "Techniques for Remotely Monitoring Canopy Development, and Estimating Grain Yield of Moisture Stressed Corn," pp. 45-52, 62, 64 (1983), University of Nebraska.

Primary Examiner—Clark A. Jablon
Attorney, Agent, or Firm—Larry W. Evans; Joseph G. Curatolo; T. W. Gilbert

[57] ABSTRACT

An apparatus for determining the water stress condition of an agricultural crop growing in a field includes sensors for sensing environmental and crop conditions, such as air temperature, crop canopy temperature and relative humidity, and for generating signals indicative of the sensed conditions, a microprocessor for receiving the generated signals and for calculating a crop water stress index from the signals and a visual display for displaying, in the field, the calculated index. In one embodiment, the sensors are mounted in a pistollike, hand held housing and the microprocessor, display and a keyboard control are carried by a second housing. The microprocessor compares one or more of the sensed conditions to reasonable value limits and rejects a set of measurements containing values beyond the limits. Crop-specific data needed to calculate water stress indices for a particular crop are stored in a programmable, read only memory. When data for a different crop are needed, the memory may be removed and replaced by a memory containing the appropriate crop data, or, if erasable, the memory may be erased and reprogrammed for the different crop. The apparatus preferably includes a memory for storing a number of calculated crop water stress indices, each calculated from conditions sensed on a different day, in records including the date of the measurements. The stored indices can be retrieved and displayed with their measurement dates so that historical trends of crop water stress may be discerned.

33 Claims, 4 Drawing Sheets

APPARATUS FOR DETERMINING WATER STRESS IN CROPS

This application is a continuation of U.S. patent application Ser. No. 009,991 filed Feb. 2, 1987, now abandoned, which was a continuation-in-part of U.S. patent application Ser. No. 735,798 filed May 17, 1985, now U.S. Pat. No. 4,755,798 issued July 5, 1988.

DISCLOSURE

This invention relates to apparatus for determining water stress in growing agricultural crops so that irrigation of the crops can be economically planned to maximize crop yield without consumption of excessive amounts of water.

BACKGROUND

Economic irrigation of growing agricultural crops is of increasing importance. In many drier regions, water availability is being continually reduced. As a result, the water that is available must be ever more carefully used by farmers in order to maintain crop yield. Even in areas where water for irrigation is in plentiful supply, irrigation needs to be carefully planned to minimize costs and to avoid overwatering. Excessive watering can erode soil and leach valuable plant nutrients from the soil.

For many years, irrigation of agricultural crops has been performed in a relatively unsophisticated manner. For example, some crops are periodically watered at fixed intervals for an established time. Other crops are watered so as to maintain a particular soil moisture level. These procedures do not prevent crop damage from over or underwatering, excessive water use, nor minimize expenses.

In an effort to provide guidelines for more efficient and effective irrigation of crops, various groups of soil, crop and field conditions, such as soil moisture content, crop and air temperature, relative humidity, sunlight intensity and water flow have been monitored for various growing crops. Researchers have attempted to correlate the results of these measurements with crop growth and yield. It has been a goal of these studies to devise one or more indices of crop water stress that indicate whether or not a crop needs irrigation. If such a measurement were available, a crop could be irrigated only when the measured stress indicated that adverse consequences may result should the crop not be watered.

Crop water stress can be measured in various ways. One technique is the measurement of crop canopy (leaf) temperature in relationship to the air temperature. When a leaf is freely transpiring, the cooling properties of the evaporating water generally keep the leaf temperature below that of the air. When the plant water intake becomes deficient, for example, when soil moisture content falls, the temperature of the leaf increases because transpiration, convection and thermal radiation dissipate less of the heat load than when plant water intake needs are met. In that case, the leaf temperature will approach, and sometimes exceed, air temperature. However, the difference between the crop canopy temperature and air temperature alone does not universally disclose water stress, since leaf temperature varies with the intensity of the sun at the leaf, the relative humidity of the air surrounding the crop and the crop itself.

Another factor that influences crop water stress is the so called vapor pressure deficit. The vapor pressure deficit is the difference between the vapor pressure of water in the air and the maximum vapor pressure of water that could be supported in air at that temperature. Vapor pressure deficit is closely related to relative humidity. Agricultural researchers found that, for well watered crops in arid climates, the difference between crop canopy and air temperatures is a predictable function of vapor pressure deficit. Further research showed this relationship applied in both dry and humid environments. (Other indices of water stress, such as the difference between the crop canopy and air temperatures alone, while useful in many circumstances, are not reliable indicators of crop water stress in humid environments.) While the expected relationship between temperature differential and vapor pressure deficit for a well watered crop is generally observed for most crops, the precise mathematical relationship between the variables differs from crop to crop, e.g., wheat, corn, potatoes and soybeans. The precise relationship for a particular well watered crop can be determined experimentally. Once that relationship is known, field measurements of crop canopy-air temperature differential and vapor pressure deficit can be made and compared to the experimentally determined relationship. If, for a given vapor pressure deficit, the temperature differential exceeds that for a well watered crop, the crop can be said to be water stressed. The degree of water stress can be determined by the amount the temperature difference exceeds that expected for a well watered crop at the measured vapor pressure deficit. When water stress exceeds an established threshold, irrigation (or some other remedy if the cause of water stress should happen not to be the result of a moisture shortage) is called for to avoid loss of crop yield.

The advances in understanding and quantifying crop water stress have enabled researchers to detect its onset and to predict its effects. Generally, these advances in research have been achieved by academic institutions and government agencies using complex and expensive instrumentation and analysis techniques. Their research has now matured so that its results could be routinely applied by farmers if they could be equipped with practical and economical instruments for determining the water stress of their growing crops. With such an instrument, a farmer can allocate water and energy resources amongst his crops so as to conserve water and minimize expenses while avoiding unnecessary losses in crop yields.

SUMMARY OF THE INVENTION

In the invention, portable, relatively inexpensive and effective apparatus is provided so that a farmer may detect water stress in his crops and respond, if necessary. In one embodiment of the invention, the apparatus is housed in a sensor unit and a control unit that are electrically interconnected. The sensor unit includes sensors to detect the environmental and crop conditions necessary to calculate one or more indices of crop water stress. The sensor unit may be pistol shaped and include a barrel holding an infrared thermometer for measuring crop canopy temperature, an air temperature sensor, a relative humidity sensor and a pyranometer for sensing the relative intensity of sunlight. These sensors generate electrical signals indicative of the conditions they detect. These electrical signals are conducted to the control unit, which may be conveniently carried by a farmer. In the control unit, a control means, preferably a microprocessor, selectively receives the sensor signals from the sensor unit. Preferably, a number of sequences of measurements of environmental and crop conditions are carried out in a single field. Measured data from each measurement sequence are temporarily stored in a memory included within the control unit. At the conclusion of each measurement sequence, all measurements of a like kind are averaged and a crop water stress index or indices is calculated from the averaged measurements. At the conclusion of measurements for an entire field, the averaged conditions are themselves averaged into field averages and a field water stress index for the entire field is calculated. The control unit preferably includes a memory for temporarily storing the field averages and for storing the calculated index or indices, identified by field and date of measurement for a longer time.

The apparatus includes a visual display on which the results of the measurements and the water stress calculations can be displayed in the field as they are made. By displaying these results in the field, an operator of the equipment can immediately undertake further investigation, as necessary, to isolate problem areas or to confirm the results of the measurement. In a preferred embodiment, the visual display provides an historical chart of field crop water stress indices so that trends for a particular field can be discerned.

While the crop water stress indices are similarly calculated for each crop, the precise result is crop dependent. The control means of the apparatus preferably includes a read only memory in which established stress data for a particular crop is stored. Preferably, this memory is electronically erasable and programmable so that by reprogramming, a particular instrument can be adapted for use with different crops. Alternatively, the read only memory may be removable for replacement with a different unit prepared for different crops.

The apparatus preferably includes checks to prevent acceptance of inaccurate measurements of environmental conditions. The crop canopy and air temperature differential may be compared to upper and lower limits of reasonable values and the operator alerted by an alarm if a measured value falls outside the limits. Likewise, the pyranometer may be used to compare sunlight intensity to an acceptable lower limit. If there is too little sunlight, preventing a reliable calculation of crop water stress index, an alarm alerts the operator. In either case, the control unit rejects unreliable measurements.

The control unit preferably includes an input means, such as a keyboard, through which the operator may direct the functioning of the apparatus. Preferably, interactive alpha-numeric text on the visual display assists an operator in using the apparatus as well as displaying the results of measurements and calculations. Through this apparatus, a farmer may cheaply and simply determine the irrigation needs of his crops both when he makes measurements in the field and later at his leisure. Preferably, the control unit includes an output means, such as a printer, disc drive or modem interface, for creating a hard copy or magnetically recorded record, or for transmission of measured and calculated field and crop data.

DETAILED DESCRIPTION OF PREFERRED EMBODIMENTS

Figures 1A, 1B:
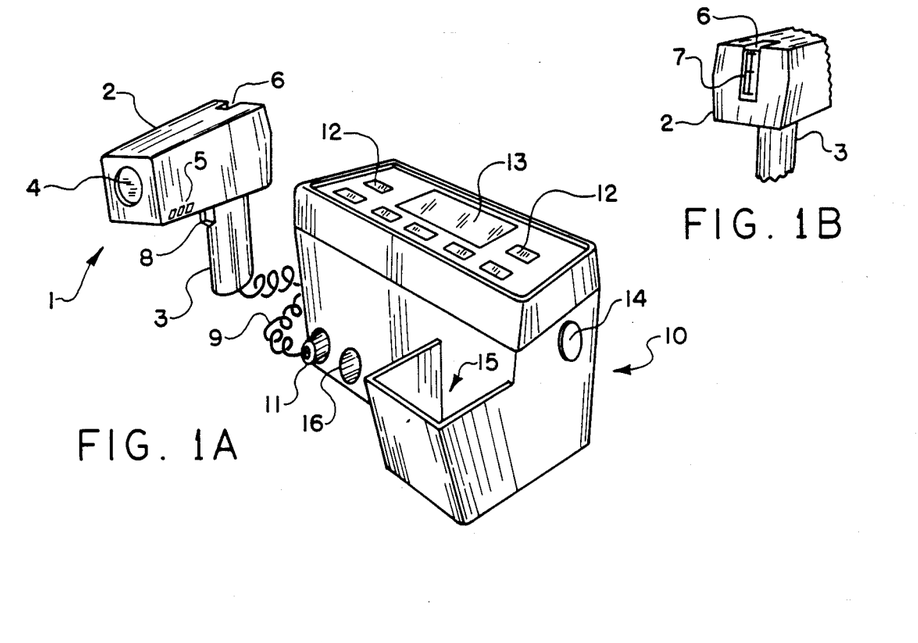
FIG. 1A is a perspective view of a preferred physical embodiment of the apparatus according to the invention.
FIG. 1B is a detail view of a portion of the embodiment of the apparatus shown in FIG. 1A.

In FIG. 1A a preferred physical configuration of apparatus according to the invention is shown. The embodiment depicted in FIG. 1A includes a sensor unit 1 that is generally pistol shaped. Sensor unit 1 includes a barrel-like portion 2 mounted on a pistol grip 3. Barrel 2 includes at its distal end a generally circular opening 4 through which electromagnetic energy can enter the barrel for detection by an infrared thermometer disposed within barrel 2. Barrel 2 includes a pair of opposed slotted openings 5 (only one pair of which is visible in FIG. 1A) on its sides proximate opening 4 through which air can enter the barrel to reach air temperature and humidity sensors. An opening 6 on the opposite end of barrel 2 from opening 4 and on the top and rear surfaces, i.e., opposite pistol grip 3, admits sunlight for detection by a pyranometer contained within barrel 2. The rear surface of barrel 2, i.e., the surface opposite the surface containing openings 4 and 5, is best seen in FIG. 1B. On that rear surface is mounted a visual display 7 for displaying the difference between a crop canopy temperature measured by the infrared thermometer contained in barrel 2 and the air temperature measured by the other thermometer contained within barrel 2. In making crop canopy temperature measurements, the infrared thermometer within barrel 2 must be disposed above the crop foliage. For the later stages of growth of particularly tall crops, such as corn and sorghum, sensor unit 1 may be elevated on an extension pole inserted in a receptacle (not shown) disposed in the bottom of pistol grip 3. Pistol grip 3 includes at its end where it joins barrel 2 an electrical switch 8 in the form of a trigger. A multiple conductor electrical cable 9 extending from the bottom of pistol grip 3 provides electrical communication and interconnection between sensor unit 1 and a separate control unit 10. Cable 9 terminates in a multiple pin connector 11 which is received by a mating receptacle on control unit 10. The housing of control unit 10 includes on its top surface a keyboard including a number of keys 12 for operator control of the apparatus. Also disposed on the top surface with the keyboard is a visual display 13 that interacts with keys 12 for control of the operation of the apparatus and for display of current and historical measured crop and environmental data and calculated crop water stress data. A pair of captive nuts 14, only one of which is visible in FIG. 1A, are provided on opposing sides of control unit 10 for connecting a strap so that the unit can be conveniently carried by an individual. The housing of unit 10 includes on its front surface a receptacle 15 that forms a holster for sensor unit 1 when it is not in use. Also disposed on the same surface is a second receptacle 16 for receiving an electrical connector. An external means of storage or transmission of the data stored within control unit 10 may be connected via receptacle 16 to receive that data.

The embodiment of the novel apparatus shown in FIG. 1A is portable and may be used by an individual in a field where a crop is growing. In one intended use, a strap is attached to buttons 14 and the strap is carried on the shoulder of the operator of the apparatus. In this orientation, keys 12 and display 13 are readily accessible to the operator who needs only to look down on them. The operator starts the apparatus by depressing the appropriate keys 12 and, with the aid of messages that appear on display 13, prepares to take measurements of environmental and crop conditions. Sensor unit 1 is extracted from its holster and after a warm-up period, the apparatus is ready to begin making measurements. The operator points sensor unit 1 in the direction of crop foliage and squeezes trigger switch 8 to initiate the measurement process. Crop canopy temperature and air temperature are measured and their difference is displayed to the operator on display 7. If sensor unit 1 is improperly aimed, i.e., at soil or sky, the temperature difference may be unreasonably large. In that event, the apparatus warns the user of the error and ceases making measurements. The sensor unit is aimed again, trigger switch 8 is depressed and the measurement process is started another time. In addition to comparing the temperature difference to a predetermined range, the pyranometer, which receives light through slot 6, compares the amount of sunlight received to a minimum limit value. If the amount of light received is too low, indicating that accurate crop stress calculations cannot be made because the foliage is shaded, the measurement sequence is also ended with the triggering of an alarm to warn the user.

When measurements have been successfully made, the environmental and crop condition data are transmitted to the control unit where that information is stored. Preferably, environmental and crop data are repetitively sampled at a fixed rate, so long as trigger switch 8 is squeezed, adequate sunlight is present and an acceptable crop canopy-air temperature differential is sensed. In these circumstances, referred to here as a measurement sequence, the farmer may hold sensor unit 1 steady or move it to scan an area. At the conclusion of each measurement sequence, a microprocessor in control unit 10 averages all like crop and environmental conditions sampled in the sequence and calculates a tentative crop water stress index from the averaged values. The last sampled conditions from the sequence and/or the averaged conditions may be shown on display 13. The averaged sequence conditions are then temporarily stored in an electronic memory. Several measurement sequences are conducted in each field containing a growing crop. For example, in a field of one to 20 acres, it is recommended that at least 15 to 20 measurement sequences be carried out. When the operator has completed measurements for a field, he so indicates through keys 12. After the operator indicates that measurements are completed, the microprocessor averages all the measurement sequence averages and from those field averages calculates a field crop water stress index. Preferably, the indices calculated for each sequence and for the field are based on measured average (i) water vapor deficit and (ii) crop canopy and air temperature difference. These values are compared to those established from measurements of well watered fields of the same crop to determine any deviation indicating water stress. The amount of any deviation may be quantified as a crop water stress index. While this water stress index is the preferred one since it is known to provide reliable results in both humid and arid environments, other indices of crop water stress can be calculated by the apparatus. Among those other indices are: (i) the standard deviation of the measured differences between crop canopy and air temperatures; (ii) the maximum canopy temperature; and (iii) the difference between the crop canopy temperature and the air temperature itself. Other indices obviously can be calculated, as will be clear from the disclosure below, provided the appropriate environmental and crop conditions are sensed and the microprocessor in control unit 10 is programmed to calculate the desired index.

The calculated field crop water stress index and field averages of measured conditions are stored in an electronic memory housed in control unit 10. Upon the operator's election, he may, by actuating the appropriate keys 12, have presented on display 13 the numerical values of calculated field water stress index and the averaged measured environmental and crop conditions. In addition, the operator may retrieve from the memory within control unit 10 historical field stress indices for the field under consideration and display them with the currently measured and calculated value. Preferably, display 13 can display these values in a graphical format as a function of measurement date so that the operator can discern trends in crop water stress for the field.

Although sensor 1 and control unit 10 are shown in FIG. 1 as enclosed in separate housings, an embodiment of the invention could include both units within a single housing. However, in the following description, the various elements of an embodiment of the novel apparatus are described with respect to the two housing apparatus depicted in FIG. 1A.

Figure 2:
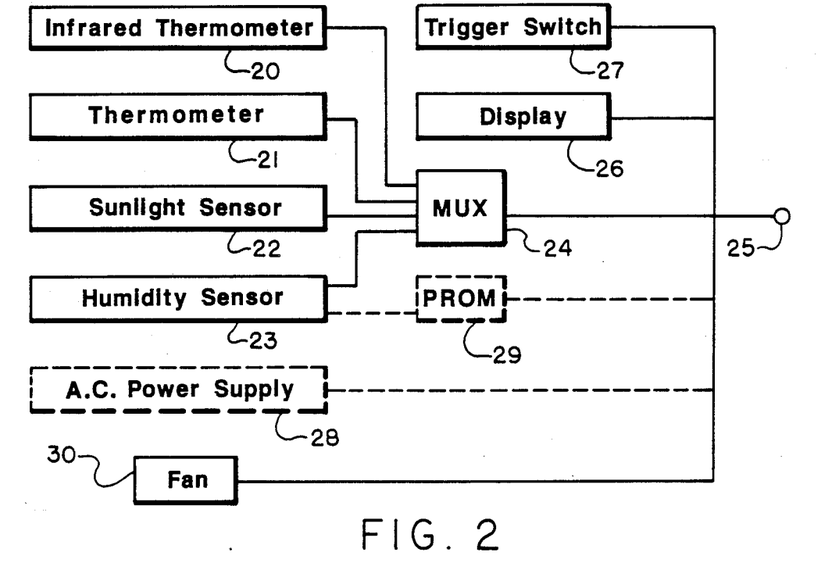
FIG. 2 is a schematic block diagram of an embodiment of a sensor unit according to the invention.

In FIG. 2, a block diagram of a preferred embodiment of a sensor unit is shown. The sensor unit includes a plurality of sensing transducers that, in combination with conventional electronic circuitry, each produce an electrical sensor signal that is indicative of a particular measured parameter. In a preferred embodiment of the invention in which a crop water stress index is measured based on water vapor pressure deficit and crop canopy-air temperature difference, the sensor unit includes an infrared thermometer 20, an air temperature thermometer 21, a sunlight sensor 22, and a humidity sensor 23. Each of the sensors produces an analog signal which is supplied to a multiplexer 24. At the direction of the control means, discussed below, multiplexer 24 supplies, preferably serially, the analog sensor signals to a terminal 25 which is in electrical communication with the control unit. The sensor unit of FIG. 2 also includes a visual display 26, corresponding to display 7 of FIG. 1B, for displaying the measured crop canopy-air temperature difference. In a preferred embodiment, the sensor unit includes a trigger switch 27, corresponding to switch 8 of FIG. 1A, for initiating and sustaining a measurement sequence. When trigger switch 27 is actuated, it sends a signal via terminal 25 to the control unit so that the control unit can initiate and sustain a measurement sequence. The control unit then activates multiplexer 24 via terminal 25 to receive from the sensors and to transmit to the control unit a group of analog sensor signals. Once the control unit has begun receiving the temperature measurements of the crop canopy and air, it sends information back through terminal 25 to display 26 in order that the measured temperature differential may be visually displayed. Clearly, FIG. 2 is merely schematic, and terminal 25 represents a multiple conductor interconnection through which digital and analog information passes back and forth between the control unit and the sensor unit.

Infrared thermometer 20 may be a conventional unit such as a thermopile comprising a plurality of series connected thermocouples. Infrared thermometers for measuring crop canopy temperature are commercially available from a number of sources, including Everest Interscience of Tustin, Calif. Air temperature thermometer 21 can be a thermistor that changes its resistance in response to the ambient temperature. Thermistors are conventional electronic devices that are available from a wide number of sources. Precision thermistors are available from Yellow Springs Instrument Company of Yellow Springs, Ohio.

Figure 3:
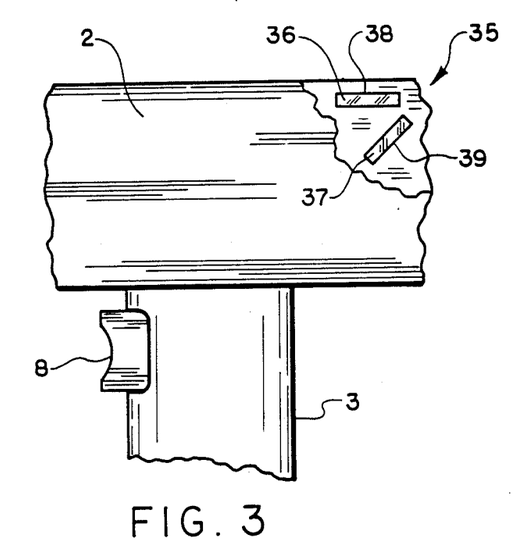
FIG. 3 is a schematic sectional view of an embodiment of a pyranometer according to the invention.

Sunlight sensor 22 can be a commercially available radiometer although it is preferred that a simple, less expensive pyranometer comprising at least one photodiode be used as a pyranometer. The photodiode generates an electrical current that varies in response to the intensity of the sunlight falling on it. In order to make an accurate measurement of sunlight intensity, the photodiode should have the same orientation with respect to the sun in each sequence of measurements made in a particular field. In a portable embodiment of the invention including a pistol-like sensor unit such as is shown in FIG. 1A, repeating a precise orientation of the sensor unit with respect to the sun for each measurement is difficult. In order to overcome this problem, a preferred embodiment of the invention includes a pyranometer 35, shown schematically in FIG. 3. FIG. 3 is a sectional cut-away view of a portion of sensor unit 1 of FIG. 1A. Like elements are given the same reference numbers. Pyranometer 35 is disposed within opening 6 on the top and rear surfaces of barrel 2. The pyranometer includes two photocells 36 ad 37. Cells 36 and 37 each include a substantially planar surface 38 and 39, respectively, through which sunlight passes in order to generate increased current flow through the diodes. In pyranometer 35, surface 38 is disposed substantially along the top surface of barrel 2. Surface 39 is disposed toward the rear surface of barrel 2. An obtuse angle, preferably about 120°, is formed between the normals to surfaces 38 and 39. (In practice, the light-admitting, outside surfaces of the photocells may not be planar because of their packaging. These outside surfaces can still be oriented so that normals to the underlying light sensitive surfaces form an obtuse angle.) Photodiodes 36 and 37 are electrically connected in parallel so that the total current flowing through them can be measured as an indication of the intensity of the sunlight falling on them. When sensor unit 1 is perfectly horizontal under a directly overhead sun, light only reaches diode 36. When sensor unit 1 is rotated about an axis lying generally parallel to the light sensitive surfaces of the photodiodes and perpendicular to the viewing axis of the infrared thermometer, photodiode 36 receives a decreased amount of sunlight, whereas photodiode 37 receives an increased amount. These changes largely balance each other so that the total amount of sunlight reaching the pyranometer is substantially independent of the rotation of the sensor unit about that axis. Since a sensor unit is normally oriented with the infrared thermometer looking downward at a crop canopy, a pyranometer embodiment of FIG. 3 avoids errors in sunlight sensing that could result from variations in sensor unit orientation between different sequences of measurements. Photocells are conventionally available. Photodiodes suitable for this application are available from Hamamatsu of Ridgewood, N.J.

Various embodiments of a humidity sensor 23 are available or can be devised. A common sensor consists of an air temperature thermometer, such as a thermistor, disposed within a wicking fabric supplied with a source of water. The temperature measured by this wet bulb thermometer can be used with a dry bulb temperature in the conventional way to calculate relative humidity. However, maintaining a source of water in a portable unit is a nuisance and can lead to the deposition of salts or other foreign material on the temperature sensor resulting in inaccuracies. It is therefore preferred that an electronic humidity sensor be employed as sensor 23. A suitable humidity sensor based on a thin film capacitor is available from General Eastern of Watertown, Mass. These sensors have a response that varies over four decades and require an alternating current drive. Each sensor has unique compensating coefficients for converting its response to humidity. FIG. 2 includes elements required to operate the preferred type of humidity sensor. An AC power supply 28, in response to signals received via terminal 25 from the control unit, applies an alternating current signal to capacitive humidity sensor 23. A programmable read only memory (PROM) 29 stores and supplies the compensation coefficients for the particular sensor used. PROM 29 is preferably an erasable, programmable memory in which the stored coefficients can be electrically changed in the event the humidity sensor must be replaced. Alternatively, PROM 29 might be discarded in favor of another PROM containing coefficients for a replacement humidity sensor. It is preferred that power supply 28 have two selectable amplitude output signals so that the response of the preferred humidity sensor is kept within a usable range. AC power supply 28 need be no more than a low power, crystal controlled oscillator. PROM 29 may be an electrically erasable programmable read only memory such as an NMC 9306N type available from National Semiconductor. Power supply 28 and PROM 29 are shown in broken lines in FIG. 2 because, in a two housing unit like that shown in FIG. 1A, those elements might be located within the control unit housing with communication established through terminal 25. For convenience in explanation, elements 28 and 29 have been shown in FIG. 2.

A fan 30 may be disposed within barrel 2 of sensor unit 1 to draw air through slots 5 and over thermometer 21 and humidity sensor 23. Fan 30 is not essential, but improves the accuracy and speed of the response of those sensors. Fan 30 is powered by the battery power source in control unit 10 through terminal 25. Fan 30 is preferably powered by a low power consumption motor that is only energized during measurement sequences. When the microprocessor indicates the beginning or end of a measurement sequence, it energizes or deenergizes fan 30, respectively. Suitable low power consumption fan motors are available from Micronel of Vista, Calif.

Multiplexer 24 responds to a signal received from the control unit by serially transmitting a group of analog sensor signals to the control unit. The multiplexer may be a 74HC4052, available from National Semiconductor. Trigger switch 27 is a common electrical switch.

Figure 4:
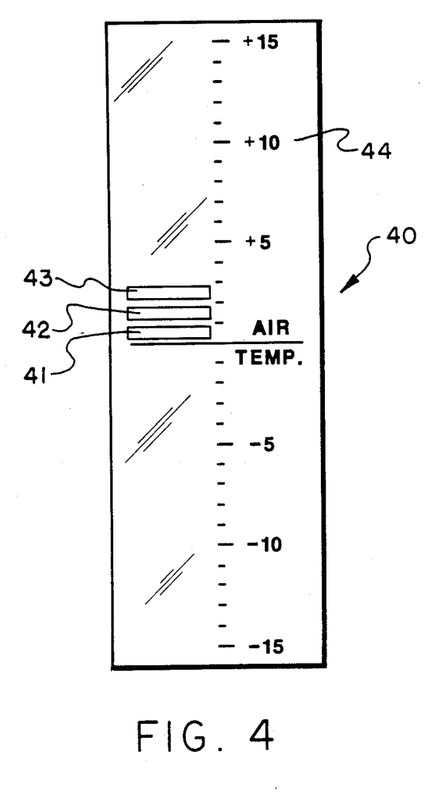
FIG. 4 is a pictorial representation of a visual display according to the invention.

Display 26 can be any visual display that responds to a signal indicative of the difference between measured crop canopy and air temperatures with an appropriate display. For example, display 26 could be a conventional numerical display, or a plurality of light emitting diodes indicating an acceptable or unacceptable measured temperature difference. A low power consumption display, such as a liquid crystal type, is preferred. In order that the temperature difference can be quickly estimated by an operator principally occupied with taking measurements and correctly aiming the sensor unit in a two housing embodiment of the apparatus, the display should be mounted on the rear of the sensor unit. As a further aid to rapid reading of the measured temperature difference, we prefer the display show the measurement result in an analog format, most preferably as a bar graph. In FIG. 4 an example of a most preferred display 40 is shown. Display 40 is a liquid crystal unit in which three variable position horizontal bars 41-43 appear opposite a vertical temperature difference scale 44 to indicate the measured result. The unit we prefer to use having the sort of display shown in FIG. 4 is manufactured by UCE Inc. of Norwalk, Conn. and may be controlled through an MM5452N integrated circuit available from National Semiconductor. As indicated in FIG. 4, there are upper and lower limits on the display, shown as plus and minus 15° F., about plus or minus 7.5° C. If the infrared thermometer in the sensor unit is directed at soil, rather than at crop foliage, the temperature difference measured is likely to exceed 15° F., since readings are taken in the presence of relatively bright sunlight. If the infrared thermometer should be directed above the horizon, at the sky, the temperature difference measured is likely to be less than minus 15° F. In one embodiment, as explained below, the apparatus warns the user of an error and rejects information acquired in the measurement sequence in which the large temperature difference is measured. With one of the preferred displays, for most crops, the operator can determine at a glance (i) whether the sensors are properly aimed and, if a correction is needed, (ii) the direction in which the unit should be moved to correct the error.

Figure 5:
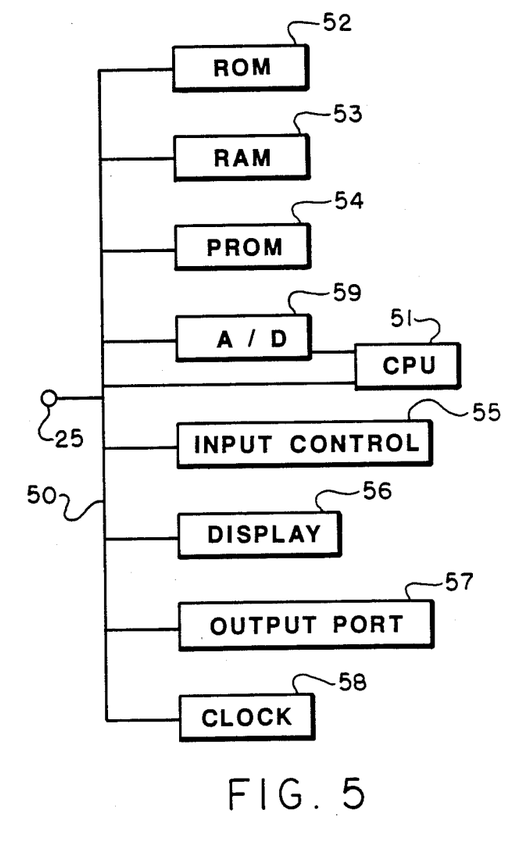
FIG. 5 is a schematic block diagram of an embodiment of a control unit according to the invention.

In FIG. 5, a schematic block diagram of a preferred embodiment of a control unit is shown. Terminal 25 indicating the multiple line interconnection between the sensor unit of FIG. 2 and the control unit of FIG. 5 is shown. Terminal 25 is in communication with a bus 50 that interconnects the fundamental elements of the control unit. While bus 50 is shown as a single line, it should be understood that bus 50 represents numerous communication channels over which the elements of the control unit can communicate with each other and over which those elements can communicate with the elements of the sensor unit. In the embodiment of FIG. 1A, the elements shown in FIG. 5 are housed within control unit 10.

The control unit and the sensor unit operate under the direct control of program instructions executed in central processing unit (CPU) 51. A National Semiconductor microprocessor designated an NSC800 has sufficient capacity and speed on which to center the design of an embodiment of the novel apparatus. Microprocessor 51 executes program instructions that are stored in a read only memory (ROM) 52. In practice, ROM 52 may include two 27C256 PROM's available from National Semiconductor. Averaged values of measured environmental conditions and calculated crop water stress indices can be stored in a random access memory (RAM) 53. RAM 53 can be any commercially available unit, such as Toshiba's TC5565PL-15L, that is compatible with the CPU and ROM and contains at least about 8K of storage capacity. A PROM 54 for programmably storing additional data communicates with other elements via bus 50. Preferably, memory 54 is an electronically erasable PROM, but may be an interchangeable integrated circuit, i.e., one that may be removed and replaced by a differently programmed ROM. Memory 54 is the same element given reference numeral 29 in FIG. 2. When the preferred humidity sensor is used, the characteristics of that unit needed to calculate humidity from its response are stored in PROM 54. In addition, the reference relationship between canopy-air temperature difference versus water vapor pressure deficit for one or more crops may be stored in PROM 54. When an apparatus according to the invention is prepared for use with one or more crops and at a later date it is desired to be used with different crops, PROM 54 can be removed and replaced with a different PROM containing the appropriate reference information for the new crops. Preferably, PROM 54 is an electrically erasable, programmable memory. In that preferred situation, when a crop list is changed, there is no need to remove a memory and replace it with another. Instead, the information stored in the memory can be electronically erased and the new data can be electronically stored in the memory. Alternatively, a long crop list might be stored in a PROM with access being limited at any one time to a particular area of the PROM. To change crop lists, new areas of the PROM may be opened and others closed. In any case, similar treatment can be given to the humidity sensor coefficient data if the preferred humidity sensor is employed.

Element 55 comprises input controls through which a human operator can initiate and direct the execution by the computer in the apparatus of various program steps stored in ROM 52. Preferably, these input controls comprise a keyboard or other means of operator interaction, such as ordinary switches, to control program execution. Preferably, input controls 55 cooperate with a display 56 to guide an operator through the functioning of the apparatus as well as to display measured, calculated and stored data.

Figure 6:
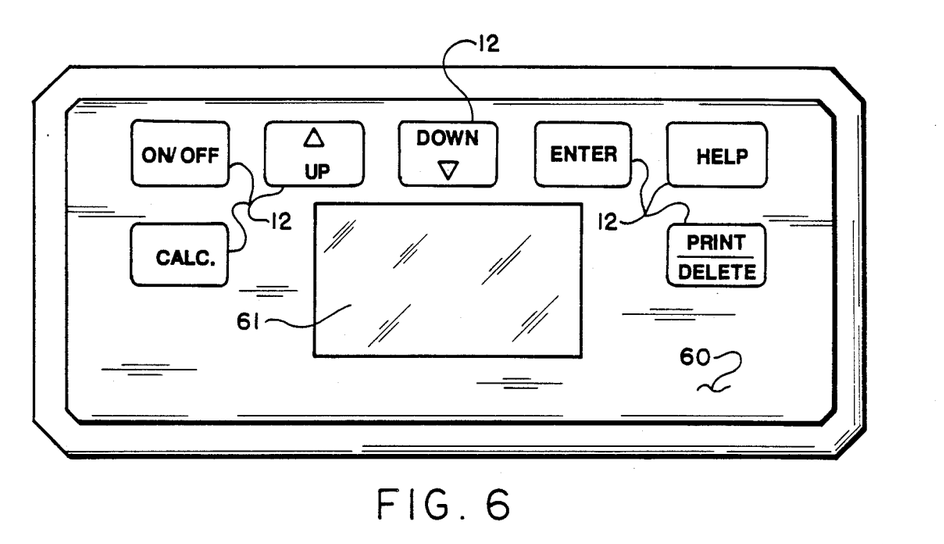
FIG. 6 is a pictorial representation of an input keyboard and display for a control unit according to the invention.
Figure 7:
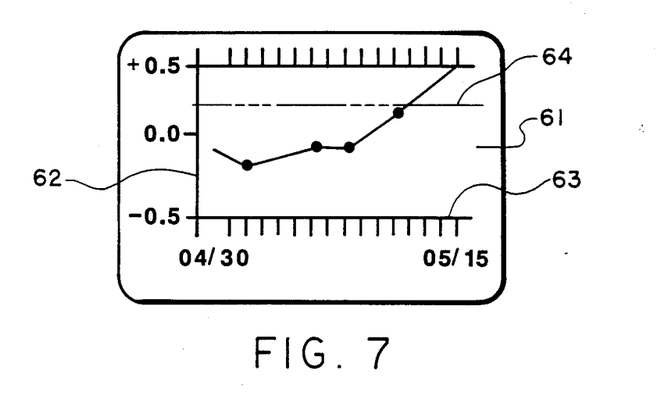
FIG. 7 is a pictorial representation of a graphical display produced by an embodiment of the invention.

Input control 55 corresponds to keys 12 and switch 8 of FIG. 1A; display 56 corresponds to display 13 of FIG. 1A. A preferred configuration of a keyboard and display such as that shown on control unit 10 in FIG. 1A is shown in greater detail in FIG. 6. There, a keyboard consisting of seven membrane-type keys 12 is shown on a surface 60 of a control unit. The keys are peripherally arranged around a relatively large display unit 61 corresponding to element 56 of FIG. 5. The keys permit the operator to turn the apparatus on and off, to select amongst program options displayed on the screen, to calculate crop water stress indices and to display on screen 61 measured environmental and crop data, calculated crop water stress index and historical calculated indices. Display 61 can be any type of display, but is preferably a liquid crystal display to minimize power consumption. An appropriate graphics module display is available under the designation LM54 or LM53A64G120 with a controller LM1001GC from Densitron Corporation of Torrance, Calif. In this module, very small groups of pixels can be individually addressed so that alphanumeric and graphical information can be composed and displayed. An example of a possible display is shown in FIG. 7. There, display 61 has plotted on an ordinate 62, for the same field and crop, a crop water stress index calculated on each of five measurement days that extended over a fifteen day period. The fifteen day period is plotted on an abscissa 63. The index calculated for the most recent measurement, indicated as occurring on May 15, is too large to fit on the display, but the connecting line to it from the most recent, previously calculated index is drawn on the display. The display includes a horizontal dotted line 64 which serves as a reference (in this case 0.2) for indicating water stress threshold. That is, display 61 preferably includes a fiduciary mark so that a farmer can readily determine whether a crop is suffering water stress and, if so, how severely. Display 61 might also be a simple digital or alphanumeric display.

Returning to FIG. 5, an output port 57 also communicates with bus 50. Preferably this output port employs an I/O device so that a standardized output signal can be generated. An NSC810, National Semiconductor I/O circuit can be used to provide a standard RS232 port for interfacing with a printer, disc drive, modem, etc. For example, when an operator inputs appropriate instructions through input control 55, CPU 51 directs RAM 53 to provide the information stored in it through port 57 to another device so that a permanent record of the stored information can be prepared or the information transmitted to another site. The final element shown in FIG. 5 is a clock 58 which may be a National Semiconductor MM58274A clock circuit. Once set, that clock circuit keeps track of time in terms of year, month, day, hour, minute, and second including corrections for leap years. This time information permits creation of a record for each measurement that is identified by crop, field, and date of measurement, and includes calculated crop water stress index.

An analog-to-digital converter 59 receives the analog sensor signals from multiplexer 24 and converts them to digital form for application to microprocessor 51. As understood by those of skill in the art, microprocessor 51 cannot process analog signals so that converter 59 is required for the sensor signals. In the embodiment of the invention described, only the sensor signals are in analog form and only they reach converter 59 over the multiple channel, analog and digital bus 50. The other signals on bus 50 are in digital form and those addressed to microprocessor 51 reach it without passing through converter 59. Analog-to-digital converter 59 may be a type 7109 circuit available from National Semiconductor.

In addition to the elements shown in FIG. 5, a control unit will preferably include a number of other elements, some of which are so essential that their presence is understood and some of which are useful enhancements to performance. For example, no power supply is shown, although electrical power is clearly needed to operate the apparatus. Preferably the portable apparatus is battery powered. Rechargable batteries might be used and an appropriate connector provided to connect a recharger to the batteries without removing them from unit 10. From time to time non-rechargable batteries must be replaced and in that case it is preferred that a long life battery, such as a lithium battery, be available to supply power to RAM 53, clock 58 and any other circuits that should be continuously energized. This backup power supply prevents loss of the measured and calculated data stored in RAM 53 and avoids the necessity of resetting the clock when old primary batteries are removed and before new batteries are installed. It is useful to have a piezoelectric tone generator actuated by microprocessor 51 as an alarm warning the operator of some undesired event or merely for signaling an ordinary event such as the depression of a key 12. The control unit may also include a low voltage indicator warning that the batteries should be replaced.

Figure 8:
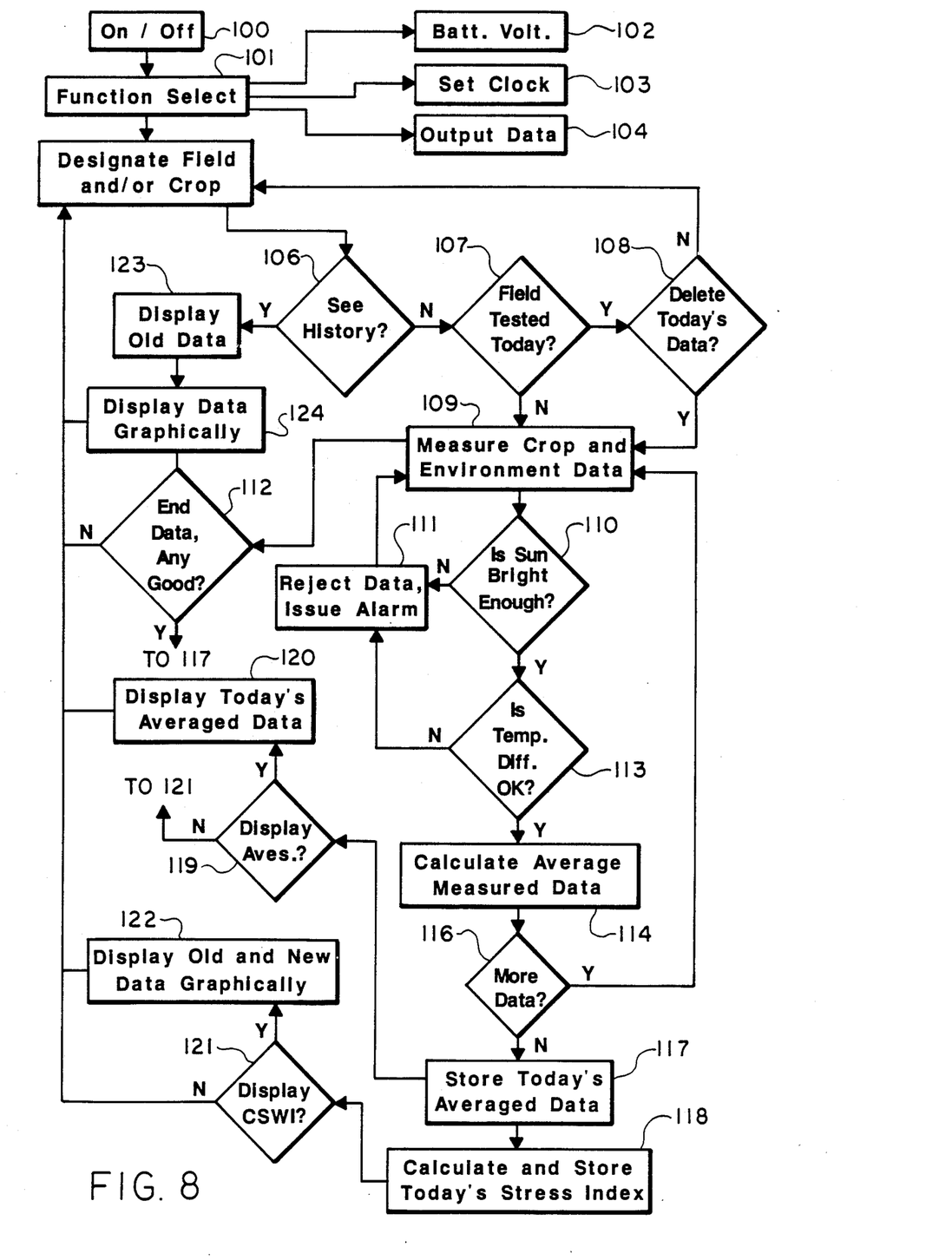
FIG. 8 is a schematic flow diagram of the logical operation of an embodiment of an apparatus according to the invention.

One method of operation of an embodiment of the apparatus containing the elements shown in FIGS. 1-7 can be understood more easily with reference to the flow diagram shown in FIG. 8. This flow diagram represents only one possible method of operation of the apparatus. The apparatus is extremely flexible. If it is desired to calculate additional or different crop water stress indices, for example, only the program instructions resident in ROM 52 need to be changed. As already noted, an embodiment of the apparatus can be modified to monitor any crop for which reference data is available simply by replacing PROM 54 or by reprogramming it. Crop water stress reference data is known to be generally available for the crops listed in Table 1 and ongoing research continues to expand the list.

TABLE 1

| | |
|---|---|
| Alfalfa | Potato |
| Barley | Pumpkin |
| Beets | Rice |
| Chard | Rutabaga |
| Corn | Sorghum |
| Cotton | Soybean |
| Cowpeas | Squash, hubbard |
| Cucumber | Squash, zucchini |
| Fig Tree | Sugar Beat |
| Green Beans | Sunflower |
| Guayule | Tomato |
| Kohlrabi | Turf Grass |
| Lettuce, leaf | Turnip |
| Millet | Water Lily |
| Peas | Wheat, produra |

Operation of the apparatus begins at block 100 of FIG. 8 when the apparatus is turned on, for example, by depressing one of keys 12. The same key may be used to turn the apparatus off. Turning the apparatus on and off is more complex than simply connecting or disconnecting the power supply. Even while the apparatus is turned off, electrical power continues to be supplied to RAM 53 and clock 58 so that stored information and clock operation is not lost. In addition, other parts of the circuitry may require continuous power to avoid loss of information that could be needed or requested later. Therefore, microprocessor 51 executes "powering up" and "powering down" instructions in response to actuation of the on-off switch. These instructions ensure that digital information stored in various registers will be the same each time the apparatus is energized. Since these "powering up" and "powering down" sequences are familiar to those of skill in the art, they are not described in further detail.

After the "powering up" initialization process, the operator is presented, at box 101, with options for the selection of the function that he wishes the apparatus to perform. Preferably, these options are presented to the operator on display 61 under the direction of CPU 51. Among the preferred options are a number of "off line" choices which would not normally selected in the field or each time the apparatus is turned on. Among such possible options are a display of the battery voltage at block 102 to determine whether the battery power supply needs to be replaced. Another option at block 103 is the setting of clock 58. In a preferred embodiment of the apparatus, the clock need only be set when the instrument is energized for the first time since the batteries will continue to power the clock even when the apparatus is off and a backup battery will continue to power the clock when the principal batteries are changed. Another off line option that is available appears at block 104 and commands microprocessor 51 to retrieve from random access memory 53 measured ad calculated data that has previously been stored and to supply that information to output port 57, corresponding to electrical connector 16 in the embodiment of the apparatus shown in FIG. 1A The output port 57 includes circuitry that adjusts signal levels and data format so that an external device, such as a printer, disk drive or modem can receive the stored data for creating a hard copy or magnetically recorded record or for transmitting the information to another location.

Assuming none of the off line options is selected, in response to a further instruction from the operator, the preferred embodiment of the apparatus proceeds to block 105. Preferably, a message is displayed on display 61, corresponding to display means 56, requesting the operator to designate a field and/or crop of interest. In a preferred embodiment of the invention, records are created and maintained that include user-specified field numbers, a crop designation and a date corresponding to the month, day and year on which measurements are being or have been taken. Preferably, RAM 53 has sufficient capacity to store measured data for a large number of different fields in which a crop is growing; for example, memory space might be provided for storing information for up to two weeks for each of as many as 100 fields. It is necessary to designate the crop in order that microprocessor 51 can retrieve the appropriate crop characteristic information from PROM 54 when calculating crop water stress index. The day, month and year in which measurements are taken preferably need not be specified by the operator, but is automatically obtained by microprocessor 51 from clock 58. These operator designations are preferably made by depressing the appropriate keys 12 in response to cycling or menu-like choices presented to the operator on display 61.

Once the designations have been made, a preferred embodiment of the apparatus permits an operator to review historical measured and calculated data for the designated field and crop or to make additional measurements and calculations for that day. This election is shown at decision block 106. Assuming the apparatus is being used by a farmer in a field, he will elect not to review historical data, but to proceed with determining crop water stress for that day. By depressing the appropriate key 12, the operator proceeds to decision block 107 where the preferred embodiment of the apparatus determines whether crop and field conditions have already been measured on the same day. In order that accurate measurements of crop canopy temperatures are made, the apparatus is normally used only in the sunniest portions of the day, i.e., from late morning through late afternoon, depending upon the time of year. Since crop water stress is unlikely to change significantly during one day, and it is desirable to conserve space in RAM 53, a preferred embodiment of the invention will only permit storage of one record of measured and calculated data per field per day. In decision block 107, the apparatus determines whether that record has already been prepared and saved for that day. If it has, the program passes to decision block 108 where the operator is asked whether he desires to create a new record for that day. If so, that new record, when created, will in the preferred embodiment, replace the previously stored one. If the operator elects to create a new record for that day, he makes that election by pressing an appropriate key 12 passing the program to block 109. If the operator elects not to change that day's record, which, for example, might happen if he has erroneously designated the field at step 105, CPU 51 returns the program to block 105 for a corrected field designation or for the selection of a different field. At decision block 107, if the designated field has not been measured on that day, CPU 51, at the direction of the program, proceeds directly to block 109. At block 109, the control unit instructs the sensor unit to prepare to make a measurement of environmental field and crop conditions. An actual measurement sequence preferably begins in response to an operator cue, for example, from depressing an appropriate key 12 or from pressing trigger switch 8 when the embodiment of FIG. 1A is employed. Once a measurement sequence begins and so long as it continues (e.g., for as long as trigger switch 8 is depressed), groups of sensor signals, each group including a sensor signal indicative of one of the measured conditions, are repetitively and sequentially transmitted by multiplexer 24, at the direction of CPU 51, to the control unit. The intensity of sunlight measured by the pyranometer is compared at decision block 110 to an acceptable minimum. The heat exchange process of the crop canopy depends on sunlight intensity. As a result, in the absence of sufficient sunlight, the measured canopy temperature could lead to an inaccurate water stress indication. Therefore, it is inappropriate to take measurements in the presence of cloud cover. In decision block 110, a determination is made as to whether the sunlight intensity is sufficient for an accurate determination of crop water stress. If the sunlight intensity is below the lower limit, the program passes to block 111 where sensed data from that particular sequence of sensor measurements is rejected. Preferably, an alarm is issued to warn the operator of the rejection. The alarm may be a tone produced by a piezoelectric tone generator in response to an instruction received from CPU 51. An additional or separate alarm may include a message displayed on display 61. The apparatus then returns to block 109 waiting for the next indication that a measurement sequence is to begin. If the operator decides not to go forward with additional measurements, for example, on a cloudy or partly cloudy day, he enters his decision passing the program from block 109 to block 112. If any measurements have been successfully completed, the program automatically shifts to block 117 for calculation of a crop water stress index, as hereinafter described. If no successful measurements have been made, the program returns to the field designation step 105.

Once the operator gives an indication to begin the next measurement sequence, the program proceeds again to decision block 110. Assuming the sensed sunlight intensity is within the acceptable range, the apparatus proceeds to an optional decision block 113. If decision block 113 is present, a test is applied to determine whether the difference between the measured crop canopy and air temperatures falls between acceptable upper and lower limits. For most, but not all, crops that temperature difference will not reasonably exceed a small range, for example plus and minus about 15° F. If the measured difference falls outside the upper or lower limits, it is most likely because the infrared thermometer has not been pointed entirely at crop foliage, but is also attempting to measure the temperature of either soil or the sky. If the permissible temperature difference range is exceeded, the program again proceeds to step 111 where the measurement sequence is ended and sensor signals are rejected. Preferably, an alarm is given, such as a tone and/or a message on display 61. In an embodiment of the invention such as that shown in FIG. 1A, including on the rear of sensor unit 1 a display such as display 40 shown in FIG. 4, a visual alarm may also be presented to an operator. That is, in the bar graph display of FIG. 4, the bars indicating the temperature difference will reach one of the extreme ends of scale 44. This kind of display on the sensor unit is particularly helpful to an operator who is immediately warned that the aim of the sensor unit is incorrect. He can quickly reclaim the sensor unit and depress trigger switch 8 again, corresponding to block 109 in FIG. 8, to initiate another sequence of field and crop conditions. For some crops, one or both of the temperature difference limits may be omitted or the range between them expanded beyond the exemplary 30° F., because of crop characteristics. These changes are easily accommodated in the novel instrument as changes in the computer program stored in ROM 52. In an instrument intended to be used with only one crop, the scale of display 40 can be modified from that shown in FIG. 4 to meet the particular characteristics of the crop.

Assuming that a measurement sequence has been satisfactorily completed, the sensed crop and environmental conditions for the sequence are averaged at step 114 and a crop water stress index for the sequence is calculated. Preferably, the final measured crop and environmental condition for the sequence and the calculated water stress index are visually displayed, although that step is not shown in FIG. 8. The operator then indicates at decision block 116 whether his series of measurements for the designated field has been completed. If it has not, the microprocessor returns to block 109 and awaits another operator instruction to initiate another measurement sequence. As previously described, it is preferred that more than one sequence of sensor measurements be taken for a field, depending on the size of the field. Once a sufficient number of sensor measurements have been obtained, as indicated by the operator at decision block 116, microprocessor 51 is directed, at block 117, to calculate, from the averaged sequence crop and environmental data measurements, a field average of the crop and environmental data. These field averages are stored and, preferably, to control memory space requirements, the sequence averages are no longer stored. Preferably, to further limit memory capacity requirements, the field averaged crop and environmental data may be stored only temporarily. For example, those field averages might be deleted automatically at the end of a day, i.e., at midnight, as indicated by clock 58. From these calculated field averages, a field crop water stress index is calculated at block 118 by the microprocessor. Preferably, that crop water stress index is based upon a comparison of (i) the difference in averaged crop canopy and air temperatures and (ii) the measured average vapor pressure deficit, to the recorded values for a field of the same crop that has been well watered. These recorded values are stored in PROM 54. The mathematical calculations of this index from the measured data are relatively simple. Vapor pressure deficit is calculated directly from the field averaged relative humidity and air temperature measurements using Equation (1).

$$VPD = SVP(1-RH) \qquad (1)$$

where
VPD = vapor pressure deficit;
SVP = saturation vapor pressure; and
RH = relative humidity.

The saturation vapor pressure is temperature dependent and can be found from a table stored in ROM 52 or PROM 54. Relative humidity as used in Equation (1) is not expressed in percent, but as a unitless number not exceeding 1. Crop water stress index may be calculated using Equation (2).

$$CWSI = (Tc - Ta - Min)/(Max - Min) \qquad (2)$$

where the new variables are:
CWSI = crop water stress index;
Tc, Ta = crop canopy and air temperature, respectively;
Max = maximum crop canopy-air temperature difference that a particular crop can tolerate; and
Min = minimum crop canopy-air temperature difference expected for a particular well watered crop at a particular vapor pressure deficit.

In Equation (2), the Max and Min terms are crop specific data that is stored in PROM 54. Min is a function of the vapor deficit calculated in Equation (1).

Once the field averages of the measured values and the field crop water stress index are calculated at blocks 117 and 118, respectively, the operator may choose to display these values. If so, the averaged measured values are displayed at block 120. Similarly, the calculated crop water stress index may be displayed at block 122 if requested by the operator. It is preferred that historical water stress index data may also be displayed. In particular, the preferred display 61 includes a graphics capability for displaying calculated crop water stress as a function of measurement date. An example of such a display is shown in FIG. 7 where measured data for a 15 day period is shown. It is unlikely that a particular value of crop water stress index has a particular meaning to a farmer so that the number calculated from Equation (2) may be adjusted to produce an arbitrary threshold value of stress. That is, if according to one calculation a crop water stress index of 0.2 (as shown in FIG. 7 as reference line 64) indicates a water stress threshold, that value could be adjusted before it is displayed or stored. For example, indices generally ranging from one to ten might be indicated on display 61 with a water stress threshold of 5.0. Depending on whether a farmer wishes to avoid all water stress or to maintain a certain degree of water stress on a crop, he makes an irrigation decision based on the deviation of the index, over time, from the stress threshold. At the conclusion of any operator selected display steps, the program returns to block 105 for designation of a new field and/or crop for which measurements are to be taken.

In steps 117 and 118, the calculated averages of the measured field and crop conditions and the calculated water stress index form, with a user-designated field and crop identifiers and an automatically retrieved day and month, a record that is stored in RAM 53. For a particular random access memory, there is an upper limit to the number of records that can be stored. Therefore, it is preferred that the stored information be periodically saved in an off line step such as that described for block 104. After that information is transferred or recorded elsewhere, it may be erased from RAM 53. If the operator elects not to erase the information, it is preferred that, when for a particular field the random access memory can no long accommodate additional records, each new record displace the oldest record for that field. In that way the most current data is always retained.

If at decision block 106 the operator has elected merely to review historical data stored within the apparatus, the microprocessor directs memory 53 to display the historical averages of measured field and crop conditions and calculated water stress indices on display 61. This information can be displayed sequentially under the control of the operator. In addition, the microprocessor can direct that the graphical presentation of FIG. 7 be displayed. These options, presented in steps 123 and 124 can be particularly useful to a farmer who is analyzing data in his office after it has been collected in the field. At his option, the farmer can study the same information in printed form after extracting it from the apparatus at block 104.

The flow diagram of FIG. 8 is merely representative of one possible method of functioning of a preferred embodiment of the apparatus. Various of the steps shown might be modified or omitted and additional steps may be added in other embodiments of the apparatus according to the invention. Flow diagram 8 is included to aid understanding of the invention and it in no way is intended to limit its scope. Because the novel apparatus is computer-based, it has extremely broad flexibility in the data it can receive, process and display. For example, additional or changed sensors, measurements, crop dependent parameters, and calculations and displays can readily be accommodated without changes in the general plan of the apparatus.

The invention has been described with respect to certain preferred embodiments. Various modifications and additions within the spirit of the invention will occur to those of skill in the art. Therefore, the scope of the invention is limited solely by the following claims.

We claim:

1. A portable apparatus for determining the water stress condition of an agricultural crop growing in a field comprising:

a first, pistol shaped housing carrying a plurality of sensor means for sensing a group of crop and field conditions, including air temperature, crop canopy temperature, relative sunlight intensity and relative humidity, and for generating a group of electrical sensor signals including a sensor signal indicative of each of said conditions, said pistol shaped housing having barrel means for aiming said crop canopy temperature sensor means carried by said housing at a crop and having pistol grip including trigger switch means for actuating said control means to receive said sensor signals, and wherein said relative sunlight sensor comprises at least two photoresponsive electronic devices, each device having a light-receiving surface, said surfaces being disposed at an obtuse angle relative to each other, whereby sensed sunlight intensity is relatively independent for different orientations of said barrel means;

a second housing carrying control means interconnected to said sensor means for controllably receiving said sensor signals and for calculating, in said field using said sensor signals, at least one water stress index or a particular crop;

operator input means, carried by at least one of said first and second housings and interconnected to said control means, for selectively controlling receipt of said sensor signals by said control means, said operator input means including said trigger switch means; and display means, carried by said second housing and interconnected to said control means, for visually displaying in said field the at least one calculated crop water stress index.

2. The apparatus of claim 1 wherein said control means includes memory means for storing at least one group of said sensor signal indications.

3. The apparatus of claim 1 wherein said control means includes (i) memory means for storing a plurality of said groups of sensor signal indications for an operator-identified field in which a crop is growing and (ii) means for calculating an average value of each sensor signal indication from each said group and for calculating at least one crop water stress index from said average values.

4. The apparatus of claim 1 wherein said control means includes memory means for storing, for a particular operator-identified field in which a crop is growing, at least two calculated water stress indices, each of said at least two indices having been calculated from crop and field conditions sensed on a different day and for storing with each of said indices their respective dates of said crop and field condition sensing.

5. The apparatus of claim 4 wherein said display means includes means for visually displaying in the field said at least two indices calculated from crop and field conditions sensed on different days.

6. The apparatus of claim 1 including means for calculating the difference between the sensed crop canopy and air temperatures, and wherein said first housing carries second display means interconnected to said control means for visually displaying in a field the difference between the sensed crop canopy and air temperatures.

7. The apparatus of claim 1 wherein said control means includes means for comparing a function of at least one sensed condition indicated in a said group of sensor signals with at least one limit value for said sensed condition and for rejecting said group of sensor signals when said at least one condition falls outside said at least one limit value.

8. The apparatus of claim 1 wherein said control means comprises memory means for storing crop parameters used in calculating water stress indices for a particular crop.

9. An apparatus for determining the water stress condition of an agricultural crop growing in a field comprising:

a first housing carrying a plurality of sensor means for sensing a group of crop and field conditions, including air temperature, crop canopy temperature and relative humidity, and for generating a group of electrical sensor signals including a sensor signal indicative of each of said conditions;

a second housing carrying control means interconnected to said sensor means for controllably receiving said sensor signals and for calculating, in said field using said sensor signals, at least one water stress index for a particular crop;

operator input means, interconnected to said control means, for selectively controlling receipt of said sensor signals by said control means;

first display means, carried by said second housing and interconnected to said control means, for visually displaying the at least one calculated crop water stress index; and second display means, carried on said first housing interconnected to said control means, for visually displaying in said field the difference between the sensed crop canopy and air temperatures.

10. The apparatus of claim 9 wherein said control means comprises memory means for storing crop parameters used in calculating water stress indices for a particular crop.

11. The apparatus of claim 10 wherein said memory means comprises erasable, programmable memory means.

12. The apparatus of claim 10 wherein said memory means comprises interchangeable memory means.

13. The apparatus of claim 9 wherein said control means includes memory means for storing at least one group of said sensor signal indications.

14. The apparatus of claim 9 wherein said control means includes (i) memory means for storing a plurality of said groups of sensor signal indications for an operator-identified field in which a crop is growing an (ii) means for calculating an average value of each sensor signal indication from each said group and for calculating at least one crop water stress index from said average values.

15. The apparatus of claim 9 wherein said control means includes memory means for storing, for a particular operator-identified field in which a crop is growing, at least two calculated water stress indices, each of said at least two indices having been calculated from crop and field conditions sensed on a different day and for storing with each of said indices their respective dates of said crop and field condition sensing.

16. The apparatus of claim 15 wherein said first display means includes means for visually displaying in the field said at least two indices calculated from crop and field conditions sensed on different days.

17. The apparatus of claim 9 wherein said control means includes means for comparing a function of at least one sensed condition indicated in a said group of sensor signals with at least one limit value for said sensed condition and for rejecting said group of sensor signals when said at least one condition falls outside said at least one limit value.

18. An apparatus for determining the water stress condition of an agricultural crop growing in a field comprising:

a plurality of sensor means for sensing a group of crop and field conditions, including air temperature, a crop canopy temperature and relative humidity, and for generating a group of electrical sensor signals including a sensor signal indicative of each of said conditions;

control means interconnected to said sensor means for controllably receiving said sensor signals and for calculating, using said sensor signals, at least one water stress index for a particular crop, said control means including memory means for storing, for a particular operator-identified field in which a crop is growing, at least two calculated water stress indices, each of said at least two indices having been calculated from crop and field conditions sensed on a different day and for storing with each of said indices their respective dates of said crop and field condition sensing;

operator input means interconnected to said control means, for selectively controlling receipt of said sensor signals by said control means; and display means, interconnected to said control means, for visually displaying said at least two indices graphically as a function of the date of crop and field condition sensing.

19. The apparatus of claim 18 wherein said control means includes second memory means for storing at least one group of said sensor signal indications.

20. The apparatus of claim 18 wherein said control means includes (i) second memory means for storing a plurality of said groups of sensor signal indications for an operator-identified field in which a crop is growing and (ii) means for calculating an average value of each sensor signal indication from each said group and for calculating at least one crop water stress index from said average values.

21. The apparatus of claim 18 including means for calculating the difference between the sensed crop canopy and air temperatures, and second display means interconnected to said control means for visually displaying in a field the difference between the sensed crop canopy and air temperatures.

22. The apparatus of claim 18 wherein said control means includes means for comparing a function of at least one sensed condition indicated in a said group of sensor signals with at least one limit value for said sensed condition and for rejecting said group of sensor signals when said at least one condition falls outside said at least one limit value.

23. The apparatus of claim 18 wherein said control means comprises second memory means for selectively storing crop parameters used in calculating water stress indices for a particular crop.

24. An apparatus for determining the water stress condition of an agricultural crop growing in a field comprising:

a plurality of sensor means for sensing a group of crop and field conditions, including air temperature, crop canopy temperature and relative humidity, and for generating a group of electrical sensor signals including a sensor signal indicative of each of said conditions;

control means interconnected to said sensor means for controllably receiving said sensor signals and for calculating, using said sensor signals, at least one water stress index for a particular crop, said control means including means for comparing a function of at least one sensed condition indicated in a said group of sensor signals with at least one limit value for said sensed condition and for rejecting said group of sensor signals when said function of at least one condition falls outside said at least one limit value;

operator input means, interconnected to said control means, for selectively controlling receipt of said sensor signals by said control means; and display means, interconnected to said control means, for visually displaying the at least one calculated crop water stress index.

25. The apparatus of claim 24 including means for calculating the difference between the sensed crop canopy and air temperatures, and wherein said means for comparing includes means for comparing the difference between the sensed crop canopy and air temperatures to at least one of upper and lower limit values of temperature differences.

26. The apparatus of claim 24 wherein said sensor means includes means for sensing relative sunlight intensity and said means for comparing includes means for comparing the sensed relative sunlight intensity to a lower limit of intensity.

27. The apparatus of claim 24 wherein said control means includes alarm means for signaling when said group of sensor signals is rejected.

28. The apparatus of claim 24 wherein said control means includes memory means for storing each group of said sensor signal indications.

29. The apparatus of claim 24 wherein said control means includes (i) memory means for storing a plurality of said groups of sensor signal indications for an operator-identified field in which a crop is growing and (ii) means for calculating an average value of each sensor signal indication from each said group and for calculating at least one crop water stress index from said average values.

30. The apparatus of claim 24 wherein said control means includes memory means for storing, for a particular operator-identified field in which a crop is growing, at least two calculated water stress indices, each of said at least two indices having been calculated from crop and field conditions sensed on a different day and for storing with each of said indices their respective dates of said crop and field condition sensing.

31. The apparatus of claim 30 wherein said display means includes means for visually displaying said at least two indices calculated from crop and field conditions sensed on different days.

32. The apparatus of claim 24 including means for calculating the difference between the sensed crop canopy and air temperatures, and second display means interconnected with said control means for visually displaying in a field the difference between the sensed crop canopy and air temperatures 33. The apparatus of claim 24 wherein said control means comprises memory means for storing crop parameters used in calculating water stress indices for a particular crop.

* * * * *